United States Patent
Kilper et al.

(10) Patent No.: US 10,644,801 B2
(45) Date of Patent: May 5, 2020

(54) PROACTIVE CHANNEL PROBING FOR WAVELENGTH SWITCHING IN OPTICAL TRANSMISSION SYSTEMS

(71) Applicant: ARIZONA BOARD OF REGENTS ON BEHALF OF THE UNIVERSITY OF ARIZONA, Tucson, AZ (US)

(72) Inventors: Daniel Kilper, Tucson, AZ (US); Weiyang Mo, Tucson, AZ (US); Houman Rastegarfar, Tucson, AZ (US); Mariya A. Bhopalwala, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 0 days.

(21) Appl. No.: 16/311,215

(22) PCT Filed: Jun. 29, 2017

(86) PCT No.: PCT/US2017/039924
§ 371 (c)(1),
(2) Date: Dec. 19, 2018

(87) PCT Pub. No.: WO2018/005754
PCT Pub. Date: Jan. 4, 2018

(65) Prior Publication Data
US 2019/0190604 A1  Jun. 20, 2019

Related U.S. Application Data (60) Provisional application No. 62/356,875, filed on Jun. 30, 2016.

(51) Int. Cl.
*H04B 10/08* (2006.01)
*H04B 10/294* (2013.01)
(Continued)

(52) U.S. Cl.
CPC ....... *H04B 10/2942* (2013.01); *H01S 3/1301* (2013.01); *H04B 10/0775* (2013.01);
(Continued)

(58) Field of Classification Search
CPC ............ H04B 10/0731; H04B 10/0775; H04B 10/0795; H04B 10/0797; H04B 10/0799;
(Continued)

(56) References Cited

U.S. PATENT DOCUMENTS

| | | | |
|---|---|---|---|
| 5,706,094 A * | 1/1998 | Maris | G01N 21/1717 356/432 |
| 5,748,318 A * | 5/1998 | Maris | G01N 21/1702 356/630 |
| 6,366,393 B1 | 4/2002 | Feulner | |
| 7,869,708 B2 * | 1/2011 | Evangelides, Jr. | H04B 10/0771 398/151 |

(Continued)

*Primary Examiner* — Hibret A Woldekidan
(74) *Attorney, Agent, or Firm* — Stuart H. Mayer; Mayer & Williams PC (57) ABSTRACT

A proactive and non-obtrusive channel probing scheme is provided to accurately predict channel power, gain, and optical signal to noise ratio (OSNR) without disrupting the existing connections. In one example, using a probe signal with 5 μs pulse duration in a single-hop network, rapid wavelength switching is achieved with power excursions less than or equal to 0.2 dB for different loading configurations.

16 Claims, 12 Drawing Sheets

(51) Int. Cl.
*H04B 10/296* (2013.01)
*H04J 14/02* (2006.01)
*H04B 10/077* (2013.01)
*H01S 3/13* (2006.01)
*H04B 10/293* (2013.01)

(52) U.S. Cl.
CPC ....... *H04B 10/296* (2013.01); *H04B 10/2935* (2013.01); *H04J 14/02* (2013.01); *H04J 14/0241* (2013.01); *H04J 14/0278* (2013.01); *H04B 2210/078* (2013.01)

(58) Field of Classification Search
CPC ............ H04B 10/2942; H04B 10/2935; H04B 10/296; H04B 2210/078; H01S 3/1301; H04J 14/02; H04J 14/0241; H04J 14/0278; H04J 14/0221; H04J 14/0227
USPC ...... 398/25, 30, 31, 32, 33, 37, 38, 69, 189, 398/190, 191
See application file for complete search history.

(56) References Cited

U.S. PATENT DOCUMENTS

| | | | | |
|---|---|---|---|---|
| 8,399,835 | B2* | 3/2013 | Hashimoto | G01N 21/3581 250/336.1 |
| 8,948,550 | B2* | 2/2015 | Li | G01K 11/32 385/12 |
| 9,594,023 | B2* | 3/2017 | Tamada | G01N 21/65 |
| 9,709,497 | B2* | 7/2017 | Nakagawa | G01N 21/27 |
| 2003/0053193 | A1* | 3/2003 | Minakawa | H01S 3/06754 359/333 |
| 2003/0133182 | A1* | 7/2003 | Ng | H04B 10/2935 359/341.41 |
| 2006/0024057 | A1 | 2/2006 | Kilper | |
| 2009/0097854 | A1* | 4/2009 | Futami | H04B 10/29 398/98 |
| 2010/0221012 | A1* | 9/2010 | Awaji | H01S 3/06708 398/79 |
| 2014/0306101 | A1* | 10/2014 | Zornoza Indart | G01D 5/35364 250/227.14 |
| 2016/0233956 | A1* | 8/2016 | Kang | H04B 10/071 |

* cited by examiner

PROACTIVE CHANNEL PROBING FOR WAVELENGTH SWITCHING IN OPTICAL TRANSMISSION SYSTEMS

CROSS REFERENCE TO RELATED APPLICATION

This application is a National Stage in the United States of International Application No. PCT/US 17/39924, filed Jun. 29, 2017 which claims the benefit of U.S. Provisional Application No. 62/356,875, filed Jun. 30, 2016, the contents of which are incorporated herein by reference.

GOVERNMENT FUNDING

This invention was made with government support under Grant Nos. EEC0812072 and 1601784 awarded by NSF. The government has certain rights in the invention.

BACKGROUND

With the advent of the Internet of Things and regular data transfers between geographically-distributed data centers, metro traffic is becoming less aggregated, exhibiting more burstiness. There is a requirement to provide dynamic optical capabilities to support the bursts and reduce the level of peak provisioning. Migrating to a flexible optical physical layer in which the network can adapt in response to dynamic channel conditions and traffic requirements could hence lead to systems with tighter margins and greater resource efficiency.

Fast wavelength switching or reconfiguration is key to achieving a flexible optical network. The channel power dynamics that arise from continuously changing the input conditions of erbium doped fiber amplifiers (EDFAs) remain an unresolved obstacle. One main power dynamic effect is the amplifier transient effect, which is solved by fast amplifier control. However, after the transients there is still a power excursion that remains until the slow time scale adjustments of the wavelength selective switches (WSSs) and variable optical attenuators (VOAs) can correct the power levels. These power excursions grow in cascade and make wavelength reconfiguration a time consuming process. These power excursions occur due to EDFA automatic gain control (AGC), which maintains a constant gain by monitoring the total input and output power in the fiber, ignoring the wavelength dependent gain arising from gain ripple and tilt of the amplifier. The strict requirement that the modification of a wavelength should not impact other channels in a system becomes difficult to achieve in this dynamic network environment. Deviations from target power levels in optical networks can cause channels to exceed allocated margins for transmission, potentially resulting in sustained errors as the control mechanisms respond over long time periods and also may interact with other power control mechanisms, resulting in network instability. Degradations in the optical signal to noise ratio (OSNR) are also impacted by the EDFA gain profile and varying fiber plant characteristics. Note that OSNR and other quality of transmission (QoT) related monitoring methods introduced in the past require an established signal and thus only provide after the fact information for wavelength reconfiguration and cannot be used in the wavelength routing and assignment decisions that come before switching.

SUMMARY

In one aspect, a fast channel probing scheme is provided that ensures minimal disruption to other channels while examining the path prior to reconfiguration. It is demonstrated that power excursion estimates from these measurements can be used to avoid detrimental channel switching and thus facilitate fast resource reconfiguration. Probing has been analyzed in optical networks for fault diagnosis and lightpath performance estimation. Proactive and non-obtrusive probing is used to not only characterize the channel OSNR, but also to mitigate the penalties of amplifier power dynamics arising due to rapid wavelength switching. The probe is turned on for a duration that is shorter than the amplifier response time and the measurements of channel gain and OSNR are performed within this duration. A tunable source is used to proactively probe either channels in a fixed-grid or spectrum bands in a flex-grid system along a transmission path without disrupting other channels. The measured gain values are fed to a mathematical model in a controller (e.g., a software defined networking (SDN) controller) for estimating the power excursion on other channels and for allocating a channel based on an acceptable power excursion threshold and OSNR.

DETAILED DESCRIPTION

Probing Technique Principle

Figure 1:
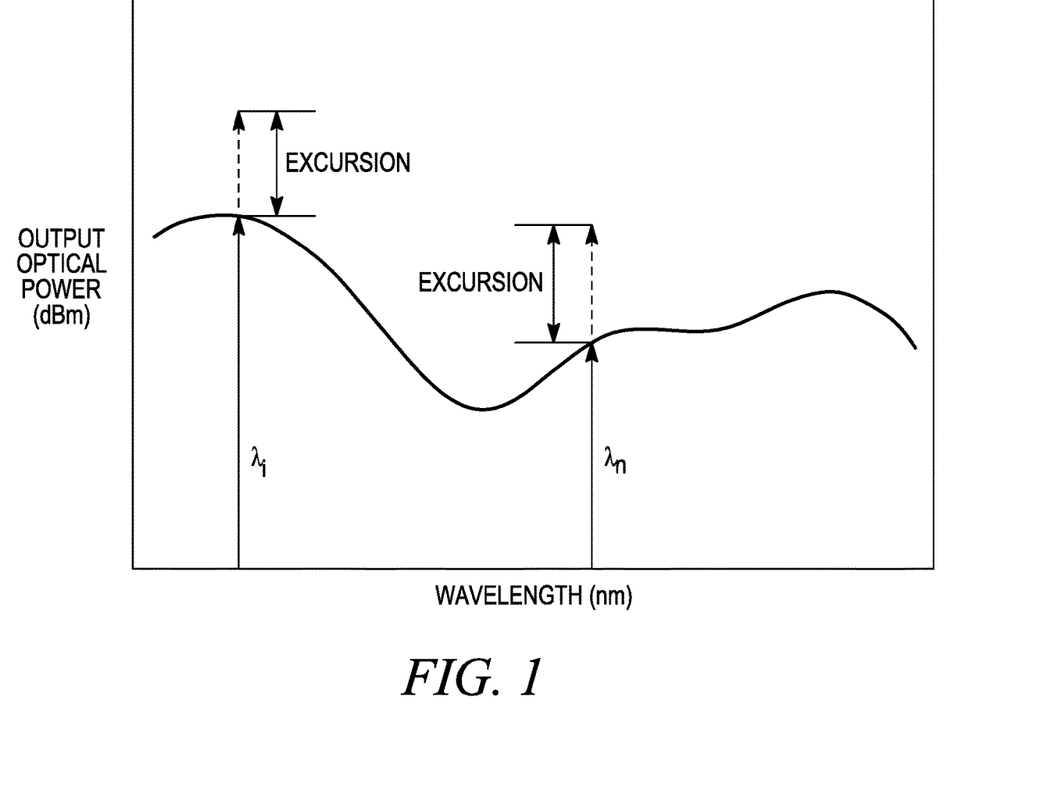
FIG. 1 depicts the output power of an erbium doped fiber amplifier (EDFA) and its gain spectrum.

In an optical transmission system, the channel power needs to be maintained within a certain range for acceptable physical layer performance. Positive power excursions beyond an upper bound can cause nonlinear transmission impairments. On the other hand, negative power excursions can result in excess OSNR degradation. For example, FIG. 1 depicts the output power of an erbium doped fiber amplifier (EDFA) and its gain spectrum. Assume a channel provisioning scenario that has an initially loaded channel at a wavelength $\lambda_i$, with the solid arrow indicating its output power. Next, a new channel at a wavelength $\lambda_n$ with the same input power is added, but due to the depicted amplifier gain profile it experiences a lower gain compared to $\lambda_i$. Its output power is also indicated in FIG. 1 by a solid arrow. In this channel provisioning scenario, the EDFA input power monitor would record twice the input power, but the total output power is less than doubled (thus violating the constant average gain criterion). The automatic gain control (AGC) circuit employed by the optical amplifier will hence increase the gain to satisfy the constant average gain condition and as a result both $\lambda_i$ and $\lambda_n$ experience a positive excursion, indicated by the dashed arrows. Note that the power excursions described above grow with a cascade of amplifiers.

Figure 2A:
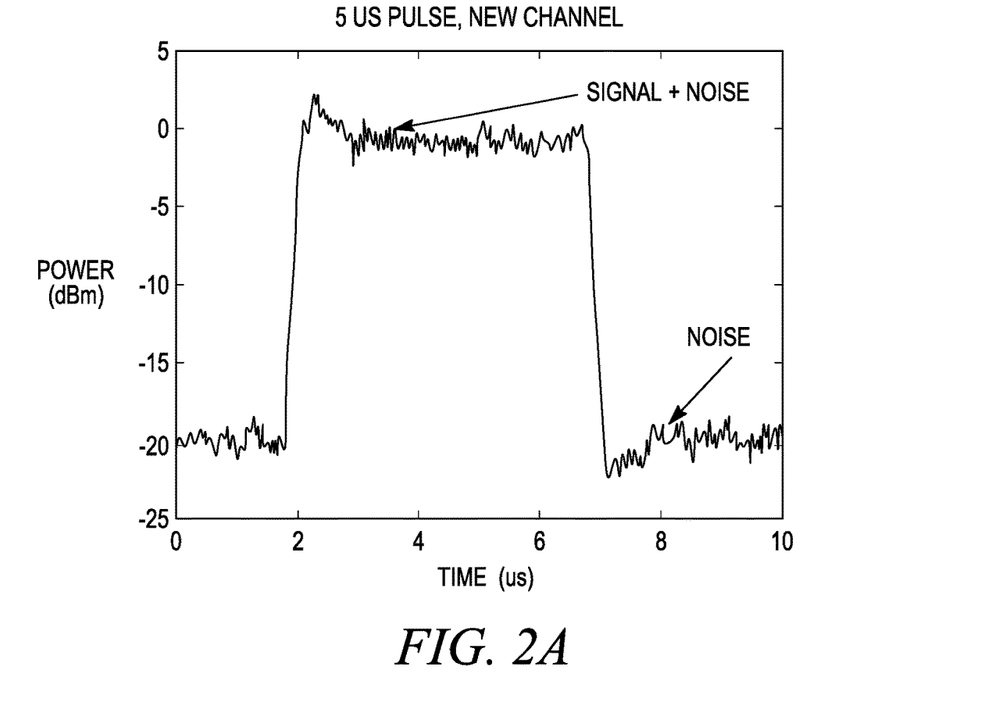
FIG. 2a shows the EDFA power excursion for a probe pulse of 5 μs and FIG. 2b shows the EDFA power excursion for an existing channel when the 5 μs probe pulse is added.
Figure 2B:
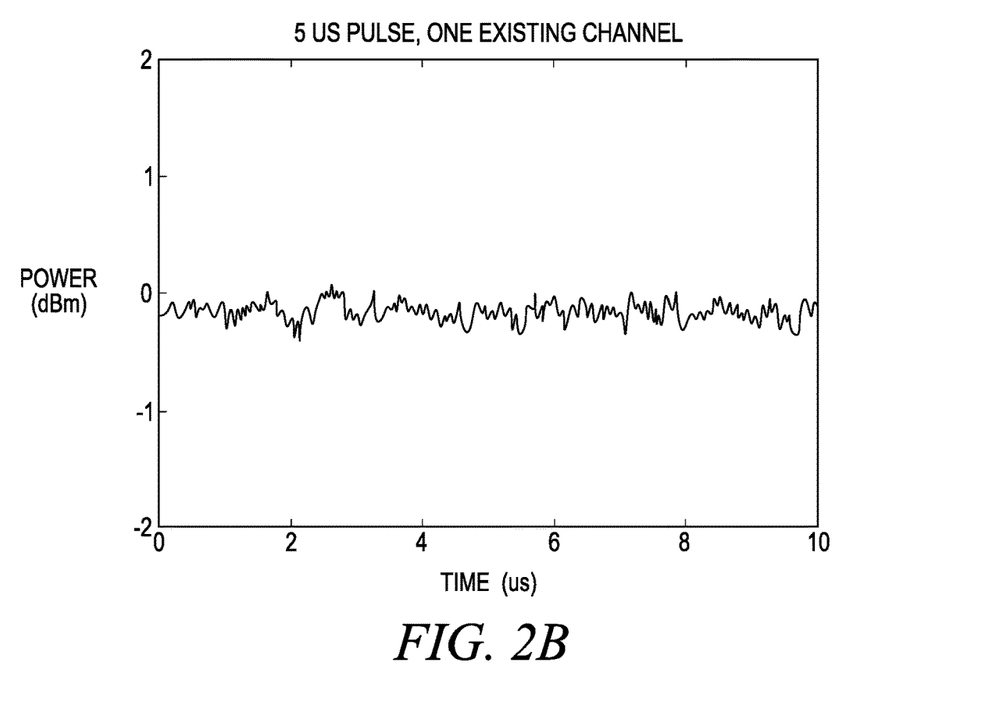
Figure 2C:
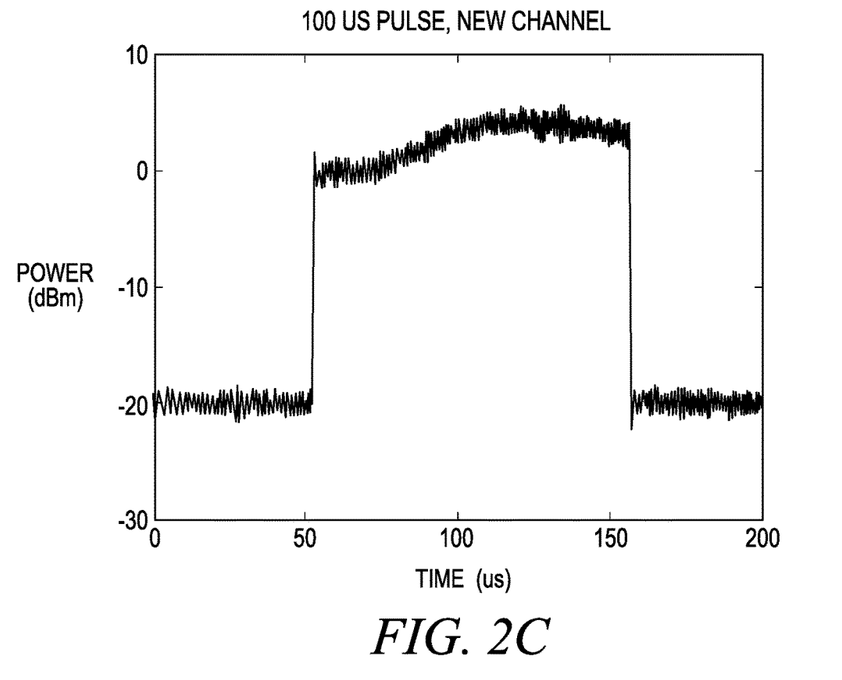
FIG. 2c shows the EDFA power excursion for a probe pulse of 100 μs and FIG. 2d shows the optical output power for an existing channel when the 100 μs probe pulse is added.
Figure 2D:
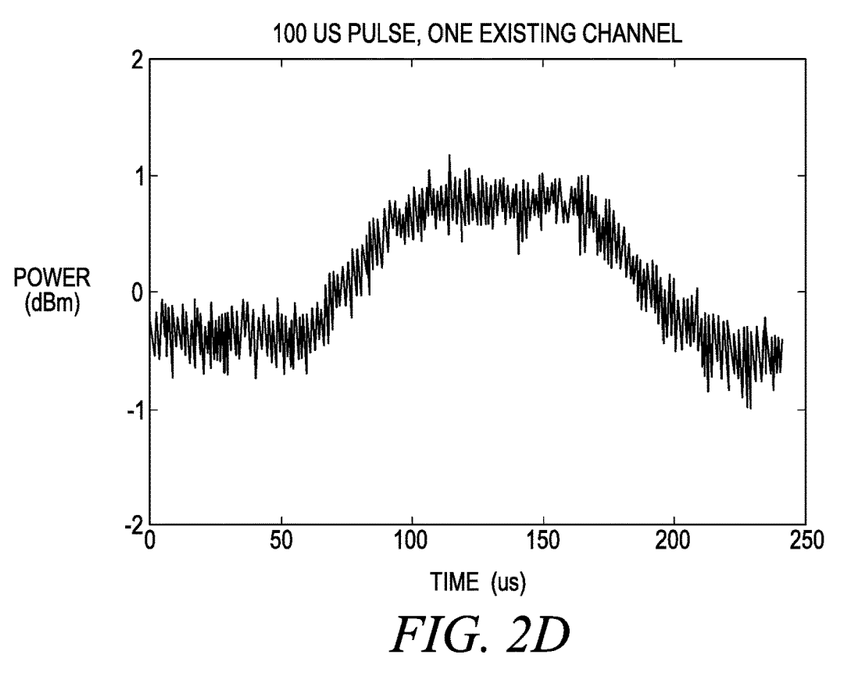

The EDFA AGC mechanisms generally have a response time on the order of hundreds of microseconds. If a probe pulse duration is much shorter than an amplifier's response time, the amplifier is unable to follow the instantaneous changes in the loading conditions and no power excursions occur. Therefore a short duration pulse can probe the EDFA gain characteristics without causing power dynamics or transient effects. FIG. 2 illustrates the EDFA power excursion captured by an oscilloscope for both the probing signal and a channel already provisioned when the probe pulse duration is either shorter or longer than the amplifier's response time. FIG. 2a shows the output optical power for a probe pulse duration of 5 μs and FIG. 2b shows the output optical power for an existing channel when the 5 μs probe pulse is added. Likewise, FIG. 2c shows the output optical power for a probe pulse duration of 100 μs and FIG. 2d shows the output optical power for an existing channel when the 100 μs probe pulse is added. No power excursion occurs when a 5 μs probe pulse is used because its duration is much shorter than the EDFA's response time. For a 100 μs pulse duration, however, power dynamics occur over the pulse because the pulse duration is longer than the AGC response time. Note that a slight over-shoot and under-shoot is seen for the 5 μs probing case, which is due to ringing on the electro-optic switch, but no EDFA response is observed. In one illustrative arrangement, the probe pulse may be generated using a tunable laser source and a nanosecond-speed electro-optical switch.

While it will often be convenient to generate the wavelength for the probe pulse with a tunable laser, in some implementations a laser operating at a fixed wavelength may be employed instead. The wavelength generated by the fixed wavelength laser may be directed to a switch that causes the probe wavelength to be directed onto the selected path for a short period of time corresponding to the specified pulse duration. This fixed wavelength laser may also be replaced by a slowly tunable laser that can be tuned to different wavelengths and then fixed in place while the probing operation is conducted. Note that as EDFAs from different vendors exhibit different response times, probe pulse durations should be carefully selected but generally should be much shorter than the amplifier's response time.

To estimate the amount of power excursion on a given channel due to wavelength switching, equation (1) may be used, which models power couplings in a constant-gain EDFA.

$$P_{o,k} = G_T \left( \sum_{j=1}^{N} P_{i,j} \bigg/ \sum_{j=1}^{N} g_j P_{i,j} \right) g_k P_{i,k} \quad (1)$$

In equation (1), $P_{i,k}$ and $P_{o,k}$ denote the input power and output power, respectively, for the probing signal at a wavelength k. $G_T$ is the target amplifier gain and $g_k$ is the wavelength-dependent gain ripple and tilt for wavelength k. N is the number of existing or lit wavelengths j. Note that for simplicity the impact of amplified spontaneous emission (ASE) noise is ignored. However, in other implementations power excursion estimates may take into account the noise contribution that arises from ASE. The input power, output power, and gain ripple $g_j$ for the lit wavelengths j can be measured, and gain ripples $g_k$ for newly added channels can be measured using the probing technique described herein. The power for lit channels can then be calculated before and after a new channel is introduced at a selected wavelength k, where the difference translates into an estimate of the channel power excursion. This process can be applied to any fiber segment between two network nodes.

Figure 3:
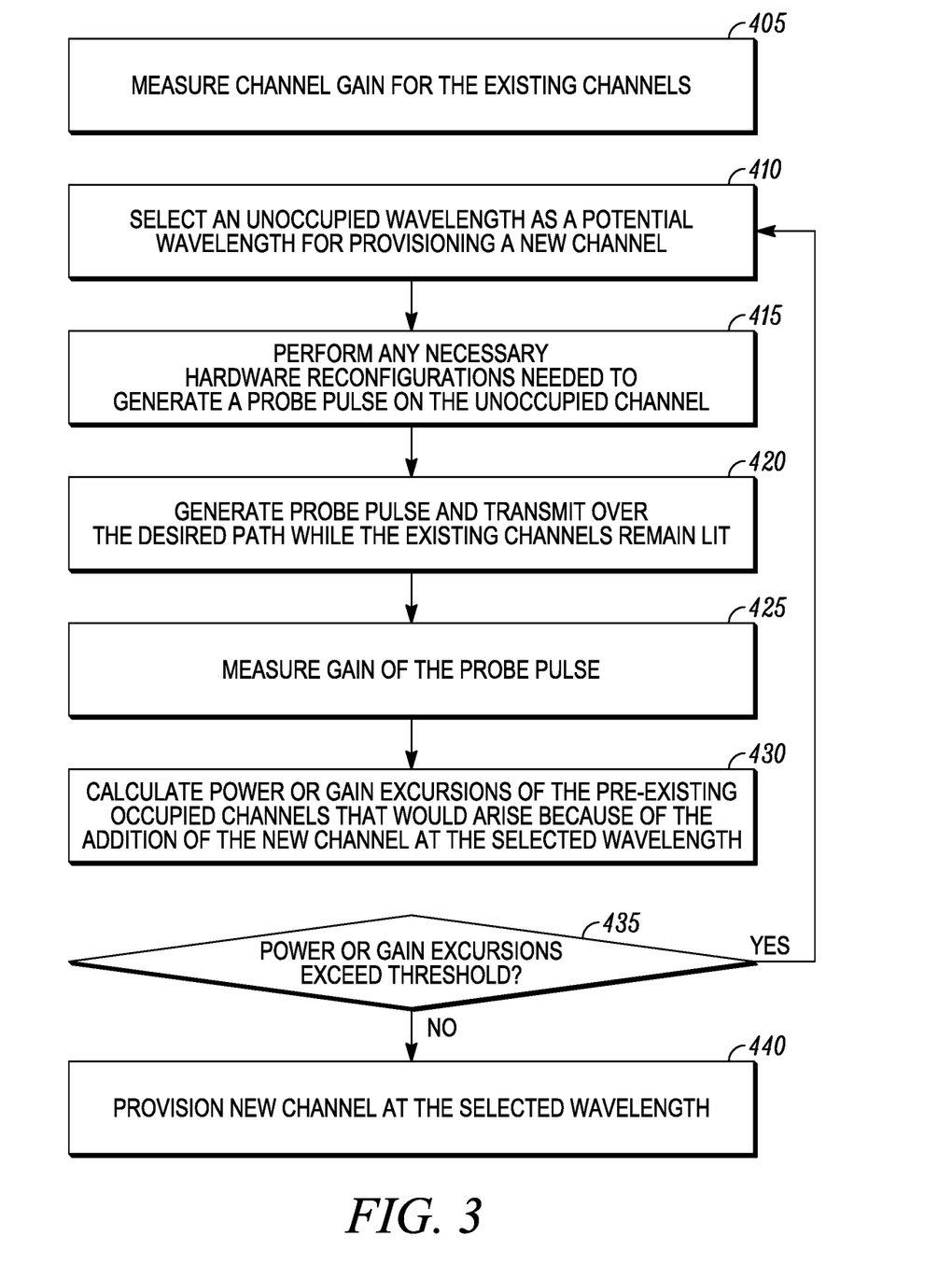
FIG. 3 is a flowchart showing one example of a method that may be employed to provision a new optical channel in a WDM optical network in which one or more optical channels already exist between nodes.

FIG. 3 is the flowchart showing one example of a method that may be employed to provision a new optical channel in a WDM optical network in which one or more optical channels have already been established between nodes. The method begins in step 405, where the channel gain is measured for the pre-existing or lit channels. Next, in step 410, an unoccupied wavelength is selected as the potential wavelength at which the new channel is to be added. Any necessary hardware reconfiguration needed to generate a probe pulse on the unoccupied channel is performed in step 415. For instance, if a tunable laser is employed to generate the probe pulse, the laser is tuned to the wavelength corresponding to the selected wavelength. The probe pulse is then generated and transmitted over the desired path in the network in step 420 while the existing channels remain lit. The gain of the probe pulse is then measured in step 425. Optionally, the OSNR of the probe pulse may also be measured. In step 430, the power or gain excursions of the pre-existing occupied channels that would arise because of the addition of the new channel at the selected wavelength are calculated using equation 1. These power or gain excursions are compared to a threshold in decision step 435. If the power or gain excursions are below the threshold, then the new channel will be provisioned at the selected wavelength in step 440. If, on the other hand, the power or gain excursions exceed the threshold, the process returns to step 410, where a different unoccupied wavelength is selected and probed. This process is repeated until a suitable unoccupied wavelength is found that does not result in a power excursion exceeding the threshold.

Figure 4:
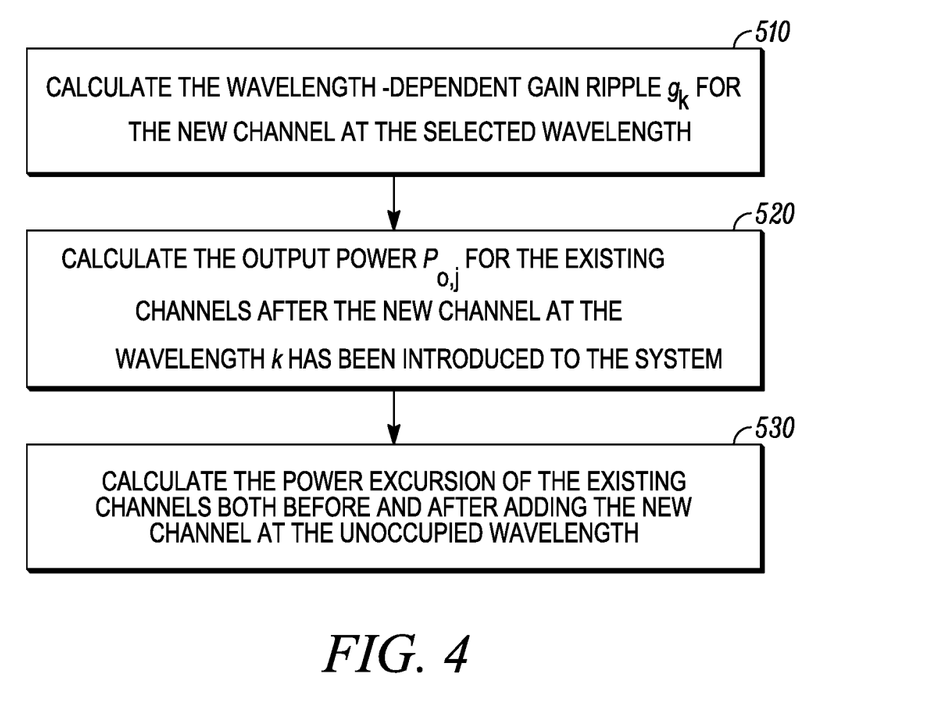
FIG. 4 is a flowchart showing one example of the calculation that may be performed in step 430 of FIG. 4 to estimate the power or gain excursions of the existing channels that arise because of the addition of a new channel at the selected wavelength k.

FIG. 4 is the flowchart showing one example of the calculation that may be performed in step 430 of FIG. 4 to estimate the power or gain excursions of the existing channels that arise because of the addition of the new channel at the selected wavelength k. First, in step 510, using equation 1, the wavelength-dependent gain ripple $g_k$ for the new channel at the selected wavelength is calculated based on the input power measurements $P_{i,j}$ of the existing channels at wavelengths j (obtained in step 405) and the input and output power measurements $P_{i,k}$ and $P_{o,k}$ of the probe signal at wavelength k (obtained in step 425). Once the wavelength-dependent gain ripple $g_k$ has been determined, in step 520 the output powers $P_{o,j}$ for the existing channels can be calculated due to the addition of the new channel at wavelength k. Since the output powers $P_{o,j}$ of the existing channels before introducing the new channel have already been obtained (in step 405), the power excursion of the existing channels can be calculated in step 530 both before and after adding the new channel at the unoccupied wavelength.

In some embodiments the methods shown in FIGS. 3 and 4 may be implemented under the control of a network controller such as a software-defining networking (SDN) controller, which can be used to control the network services and resources (e.g., network switches). An SDN controller may be implemented in a computer program executed by a processor and in some cases it may be implemented as a computer program product. Of course, more generally, the network controller may be implemented in any combination of hardware, software and/or firmware.

When selecting an unoccupied wavelength to provision a new channel at, it may be necessary to examine a series of unoccupied wavelengths and determine the power excursions that are caused by each of them. Then, the unoccupied wavelengths may be ranked based on their impact on the existing channels and the unoccupied wavelength may be selected which has the least impact on the existing channels. The unoccupied wavelengths may be ranked in a number of different ways. For instance, they may be ranked based on the amount of time that will be needed to provision the new channel at each of the unoccupied wavelengths, with wavelengths that can be provisioned more quickly being rated higher than wavelengths that will require more time to provision.

For instance, if a new channel can be provisioned at an unoccupied wavelength leading to sufficiently small power excursions that do not significantly disrupt the existing channels, then by selecting that unoccupied wavelength, the new channel can be simply turned on at its full power. This is the fastest way that a new channel can be provisioned and thus this unoccupied wavelength will be ranked the highest. On the other hand, if a new channel is to be located at a wavelength that causes greater excursions disrupting other channels, it will be necessary to make various accommodations and adjustments before the new channel can be turned up to its target power, which will require more time to implement. For example, using the techniques described herein the maximum power at which the new channel can be added to the system without disrupting the existing channels can be determined (since the power excursion depends on the power of the channel being added) and the new channel can be added at that power, after which it can be increased in a stepwise manner until it reaches its target power. The maximum power by which the channel can be increased during each step of the process can be calculated so that it can reach full power in the minimum number of steps without disrupting the existing channels during each step. The number of steps that are needed, which can be calculated in advance, will largely determine how long it will take to provision the new channel.

In some cases when a new channel needs to be provisioned at a particular wavelength that causes greater power excursions that will disrupt existing channels, additional tuning steps will need to be performed to accommodate the new channel. For instance, assume by way of example that adding a new channel at a certain wavelength at full power will cause a 1 dB excursion to the existing channels and that only a 0.5 dB excursion can be tolerated. In this case the new channel can be added in steps, with the initial step being at a power that causes no more than a 0.5 dB excursion to the existing channels. Then, adjustments can be made to reduce the power level of the existing channels by 0.5 dB. For instance, variable optical attenuators (VOAs) associated with the switches in the network nodes can be used to reduce the power levels of the existing channels so that they are returned to their target levels. Then the power of the new channel can be increased in another step and the process can be repeated until it reaches the desired full power. As part of this process it may be necessary to monitor the power of the existing channels after the adjustments have been made.

Another type of tuning or adjustment that may be needed when provisioning a new channel at a particular unoccupied wavelength is the rerouting of one or more existing wavelengths to prevent blocking along a lightpath. A new channel that can only be provisioned at a particular wavelength by rerouting existing channels will generally be the slowest wavelength at which to provision the channel. Nevertheless, the techniques described herein may be used to more quickly reroute the existing wavelengths.

In addition to provisioning a new channel in a network, the techniques described herein also may be used when dropping an existing channel at the end of service (i.e., a teardown). That is, a channel can be selected for dropping based on its impact on the remaining channels. The selected channel to be dropped may be the channel that has the least impact on the remaining channels. For instance, the dropped channel may be selected by ranking the existing channels based on the speed at which they can be dropped. For instance, a channel that is located at a wavelength that can be dropped most quickly may be designated as the first channel to be dropped. Furthermore, a channel may be reduced in power in steps and the size of the step determined by the excursion calculations. The impact of each step can be corrected through channel power tuning before the next step is taken. In this way the channel can be turned down using the minimum number of steps without disrupting other channels.

In addition to measuring the power and gain excursions that arise on existing channels when a new channel is added, other signal performance parameters may be measured as well. For instance, in some cases the OSNR of the probing signal can be estimated from the nonprobe pulse and probe pulse power levels. The nonprobe pulse power level is defined as the power level received by a photodetector adjacent to the probe pulse (e.g., the noise level as shown in FIG. 2 (a)). Likewise, the propagation delay between two probe locations can be determined by measuring the time difference between the time the probe pulse is generated and the time it is received. As yet another example, the chromatic dispersion can be determined by measuring the pulse broadening that arises between the two probe locations.

While in some cases the probe pulse may be unmodulated, in other cases it may be advantageous to modulate the pulses with data. For instance, real-time bit error rates (BER) may be determined by comparing the bit sequence of a modulated pulse that is generated with the bit sequence of the received pulse. Other performance parameters that may be determined may also employ pulses that have been modulated with data.

While in the examples described above a single channel was considered for provisioning or adding and de-provisioning or dropping, the methods described here can be applied to a multiplicity of channels for simultaneous provisioning or de-provisioning. The methods described herein can also be used to determine which combinations of channels are provisioned or de-provisioned based upon their respective wavelengths, paths through the network, priority set by the network operator or other criteria.

Illustrative System

Figure 5:
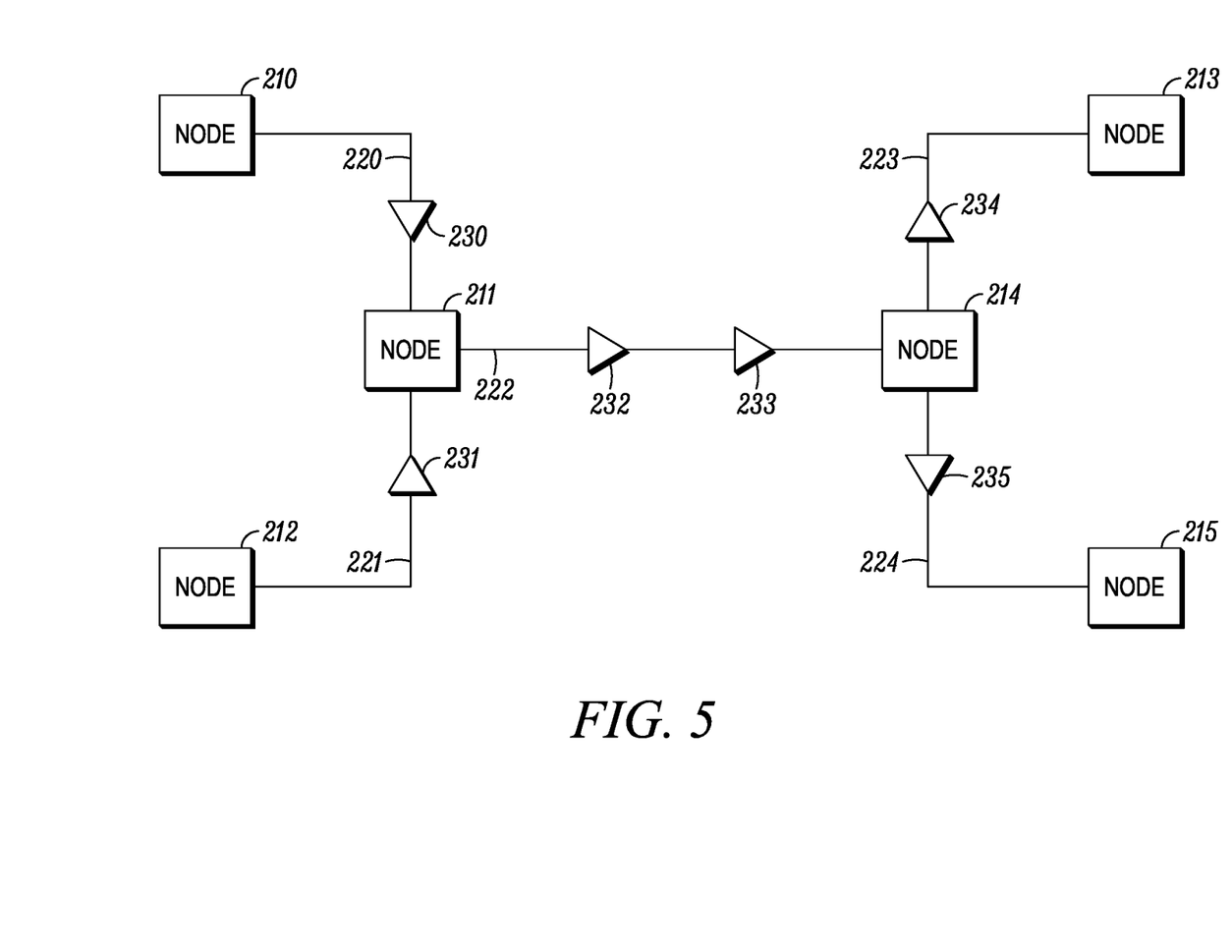
FIG. 5 shows one example of a WDM transmission network 200 that may incorporate the methods, techniques and systems described herein.

FIG. 5 shows one example of a WDM transmission network 200 that may incorporate the methods, techniques and systems described herein. WDM transmission network 200 includes network nodes 210-215. Each node is connected to at least one other node by optical links 220-224, which may comprise optical fibers through which the WDM signals propagate. For example, node 210 is connected to node 211 by link 220, and node 211 is connected to node 212 by link 221. In addition, node 211 is connected to node 214 by link 222, and node 214 is connected to node 213 by link 223. Further, node 214 is connected to node 215 by link 224. The links may each comprise at least two optical fibers that carry optical signals traveling in opposite directions to provide bidirectional communication. Capacity in any link can be increased by increasing the number of fiber pairs that are provided. Each link may include one or more optical amplifiers 230-235 for amplifying the WDM signals. For example, links 220, 221, 223 and 224 respectively include optical amplifiers 230, 231, 234 and 235. Likewise, link 222 includes optical amplifiers 232 and 233. Information is transmitted and received over WDM transmission network 200 by the modulation of one or more optical wavelengths to encode data onto the wavelengths. The various modulated optical wavelengths are combined into a single WDM signal that is transmitted over transmission links.

WDM transmission network 200 may comprise a point-to-point optical network with terminal nodes, a ring optical network, a mesh optical network, or any other suitable optical network or combination of optical networks. The number of nodes and optical links shown in FIG. 5 is exemplary and provided for simplicity of illustration. The network nodes 210-215, which may employ fixed or reconfigurable optical add/drop modules, may be in some implementations colorless and/or directionless.

Optical amplifiers 230-235 may be any suitable type of all-optical amplifier (i.e, an amplifier without any optical to electrical conversion). For example, optical amplifiers may be rare-earth doped optical amplifiers such as erbium doped optical amplifiers or Raman optical amplifiers. The optical amplifiers employed in any given transmission network may all be of the same type or different types. The optical amplifiers employ an automatic gain control (AGC) mechanism, which monitors the input and output powers to and from the optical amplifiers and adjust the gain accordingly to reduce or eliminate any deviations from the constant gain requirement. Various AGC mechanisms are well-known and accordingly do not need to be discussed in detail.

Each of the network nodes 210-215 generally includes one or more optical switches such as a wavelength-selective switch (WSS), one or more optical sources, and one or more data modulators. The optical source(s) may be, by way of example, a tunable laser (e.g., a Distributed Feedback (DFB) laser, an External-Cavity Laser (ECL), a Sampled Grating Distributed Bragg Reflector (SGDBR) laser, etc.), or any combination thereof, which generate the optical wavelengths onto which data is to be modulated. The data modulator modulates the individual wavelengths with the data. The data modulator may employ any suitable modulation format. For example, modulation may be imparted in terms of a constellation (e.g., binary, quaternary, 8-ary, 16-ary, higher order constellations, etc.) using any manner of modulation (e.g. intensity, phase, frequency, polarization). An illustrative optical modulator that may be employed is a Mach-Zehnder modulator, for example.

In some embodiments the optical switches in the network nodes may be arranged so that the nodes can function as reconfigurable optical add drop multiplexing (ROADM) nodes, which allow different channels to be selectively added or dropped or sent to different fibers based on the setting of the optical switch in the node. In some embodiments the ROADM node may be colorless (e.g., allowing any wavelength to be directed to any add/drop port), directionless (e.g., allowing any wavelength to be sent to any degree), contentionless (e.g., allowing any combination of wavelengths to be directed to any degree from any port), and/or gridless (e.g. no fixed frequency required).

Experimental Arrangement and Results

Figure 6:
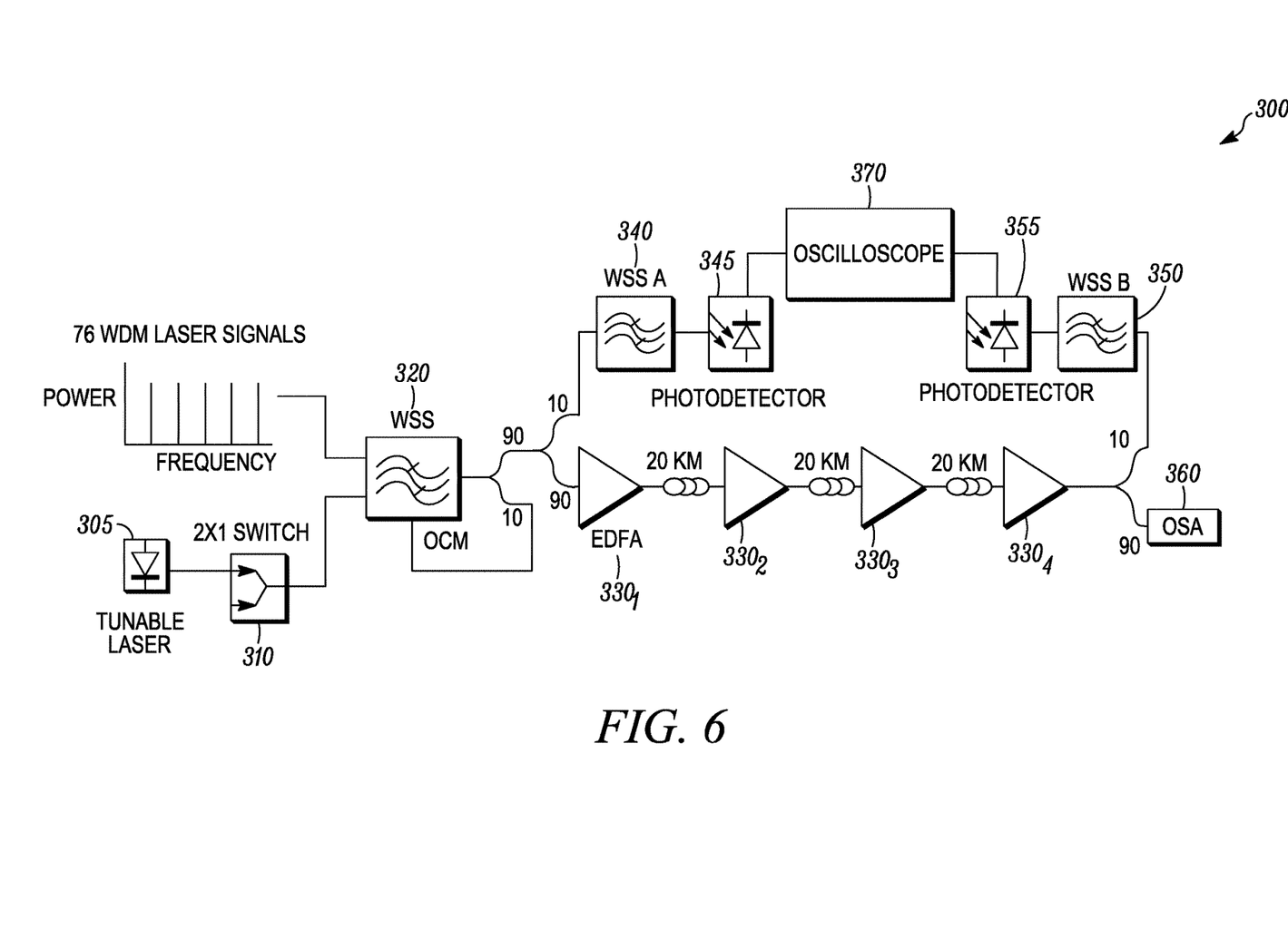
FIG. 6 shows an optical transmission system in which the techniques described herein were demonstrated.

FIG. 6 shows an optical transmission system 300 in which the techniques described herein were demonstrated. This system 300 is a three span metro network in which a full C-band tunable laser 305 connected to a 2×1 nanosecond electro-optic switch 310 is used to perform probing with a 5 µs duration pulse. The probe pulses and a WDM signal with 76 WDM channels with a spacing of 50 GHz were sent to a wavelength selective switch (WSS) 320 to create different channel loading configurations. The configuration of the WSS 320 determined the set of active channels that can exist throughout the network. The WSS 320 has a built-in optical channel monitor (OCM) port that is used to flatten and set each channel's power into the first EDFA $330_1$ at −10 dBm. Three 20 km standard single mode fiber (SSMF) spans are introduced between four EDFAs $330_1$-$330_4$ with 13 dB gain. The EDFAs $330_1$-$330_4$ were configured with a maximum peak-to-peak gain ripple of 3 dB. The probe channel at both the input and the output of the spans is selected using two WSSs 340 and 350 (WSS A and WSS B), which are representative of probing drop points located at each node. The probed values are then applied to two PIN photodetectors 345 and 355 to measure the optical powers.

Figure 7:
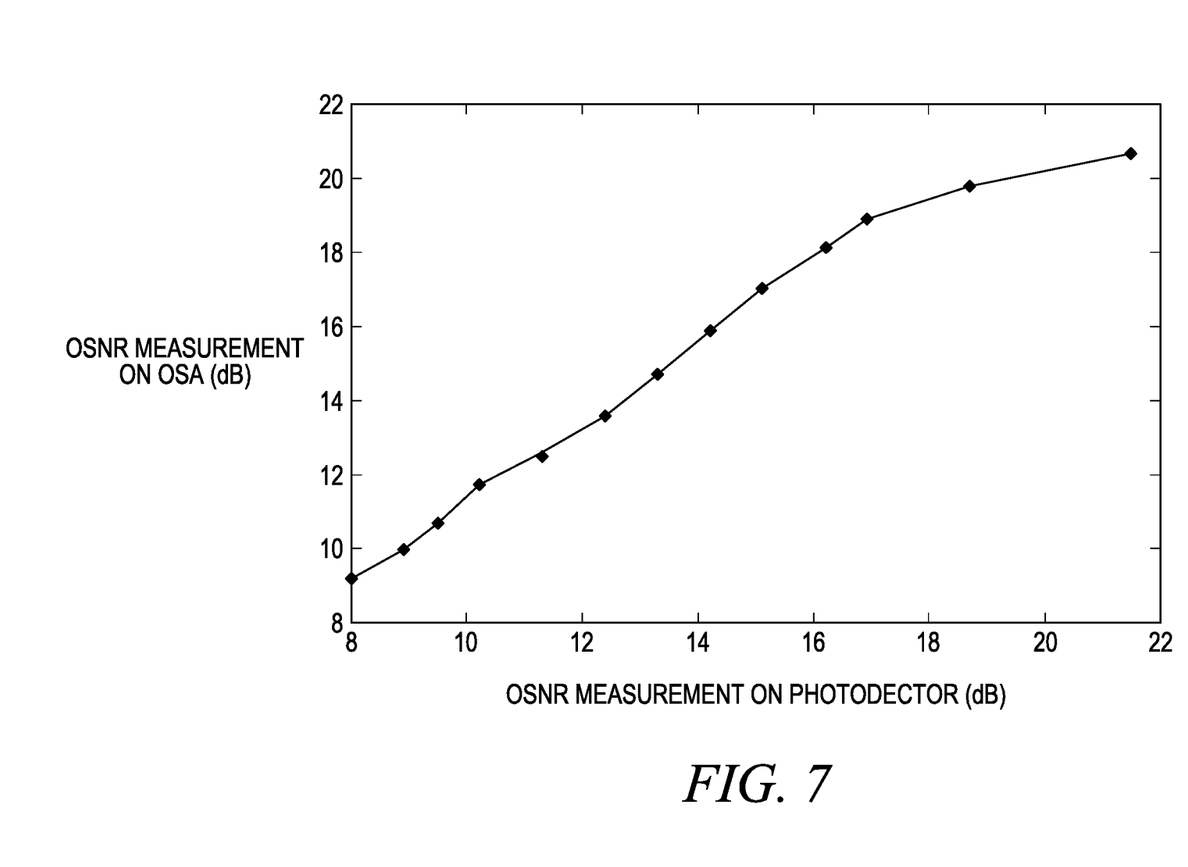
FIG. 7 shows the relationship between the OSNR measured on the photodetector and on the OSA for a probe pulse that is transmitted through the system of FIG. 6.

In order to translate the two probe readings into an actual gain for estimating power excursions, the spectrum was scanned with the tunable laser and an optical spectrum analyzer (OSA) 360 was used to measure the actual gains as a reference. A linear relationship between the OSA gain readings and the difference of the two probe signal measurements was observed, which helped calibrate the measurements from the photodetectors 345 and 355 on an oscilloscope 370. In addition to the gain from the EDFAs $330_1$-$330_4$, the OSNR can also be measured using the probing technique by calculating the difference between the probe peak and non-probe peak values as shown in FIG. 2. Again, the OSA 360 was used to provide a reference for obtaining the OSNR. The relationship between the measured OSNR measured on the photodetector and on the OSA, shown in FIG. 7, is offset but linear due to imperfect filters in the WSS.

An SDN controller was used to implement the probing technique described above in connection with the flowchart of FIGS. 4 and 5. That is, power gains for existing channels were measured and stored. The probing process was performed to determine the gains for unoccupied wavelengths by tuning the tunable laser to one unoccupied wavelength at a time and tuning the various switching elements to generate the probe pulse and enable non-obstructive probing. Channel gains were measured and power excursions due to inserting the probe pulse into the network at the unoccupied wavelength were derived using equation (1). In this way the SDN controller was able to identify the acceptable wavelengths for provisioning a new channel, which were those channels resulting in a maximum power excursion of +0.3 dB (dashed line in FIG. 6 (b)), and select one on which a new connection could be established, provided that the required OSNR could be met.

Figure 8A:
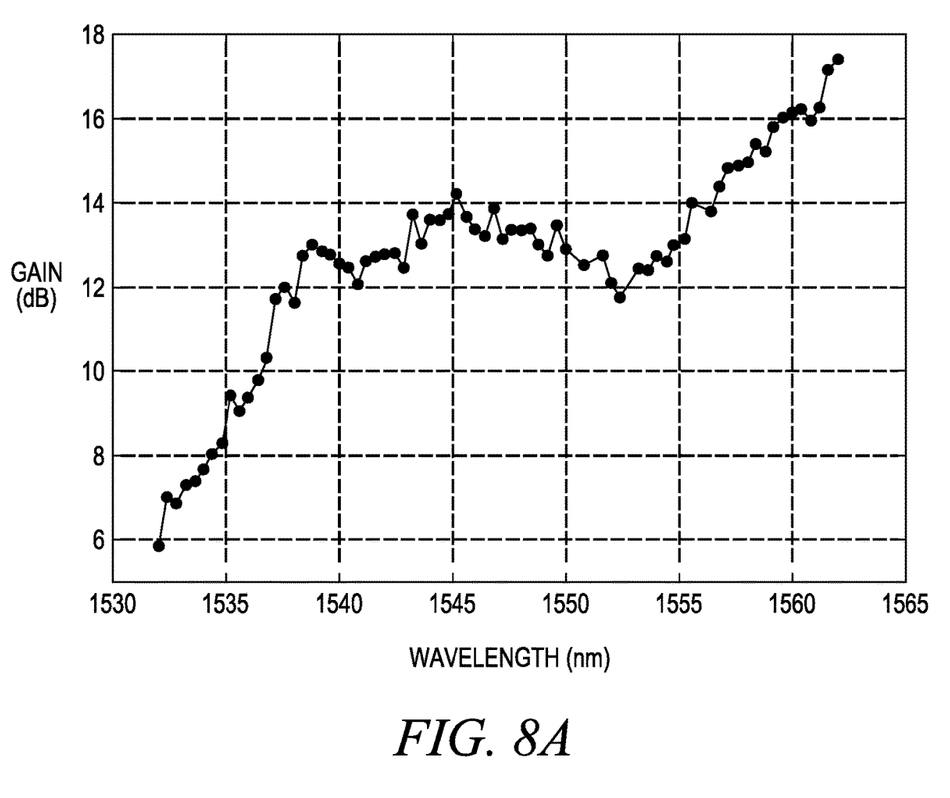
FIG. 8(a) depicts the gain spectrum measured for a probe signal at the 72 unoccupied wavelengths for the system of FIG. 6 when 4 existing channels are lit and FIG. 8(b) presents the calculated power excursions for the probed wavelengths for this loading configuration.
Figure 8B:
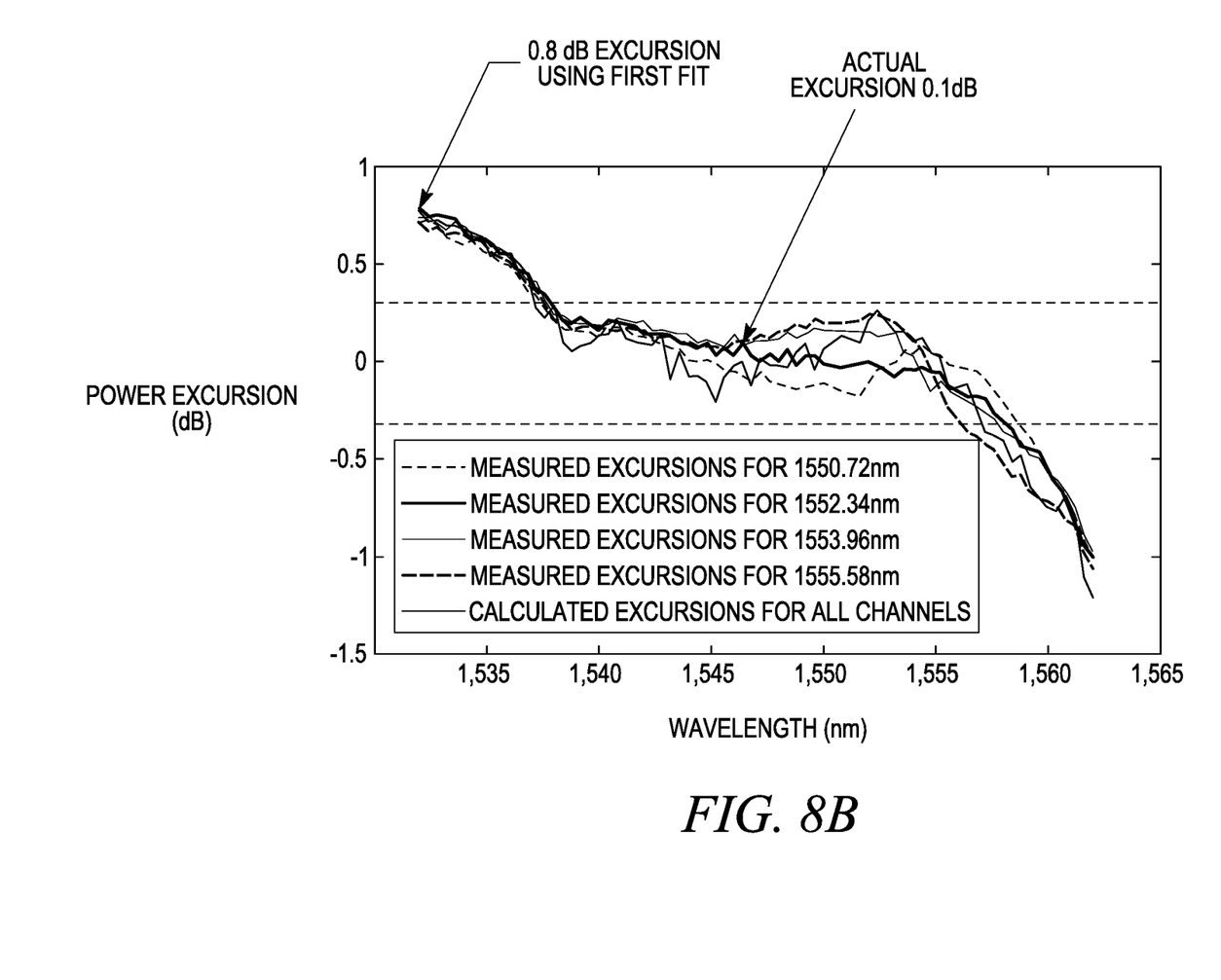
Figure 9A:
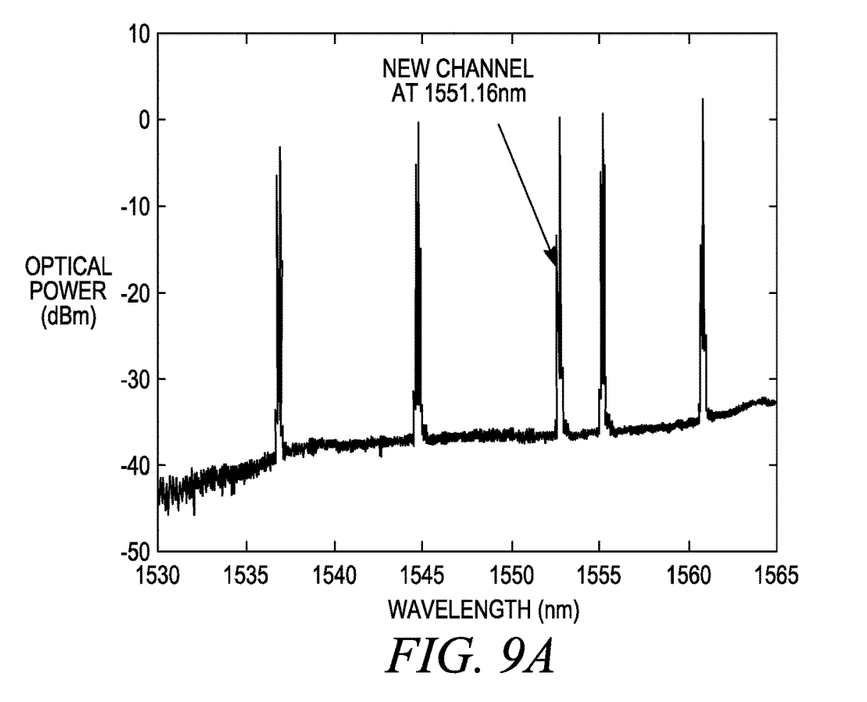
FIGS. 9(a)-9(d) show four different channel loading configurations of lit channels in which a controller establishes a new channel in each case on an unoccupied wavelength with minimal power excursion penalties based on the results obtained from the probing process.
Figure 9B:
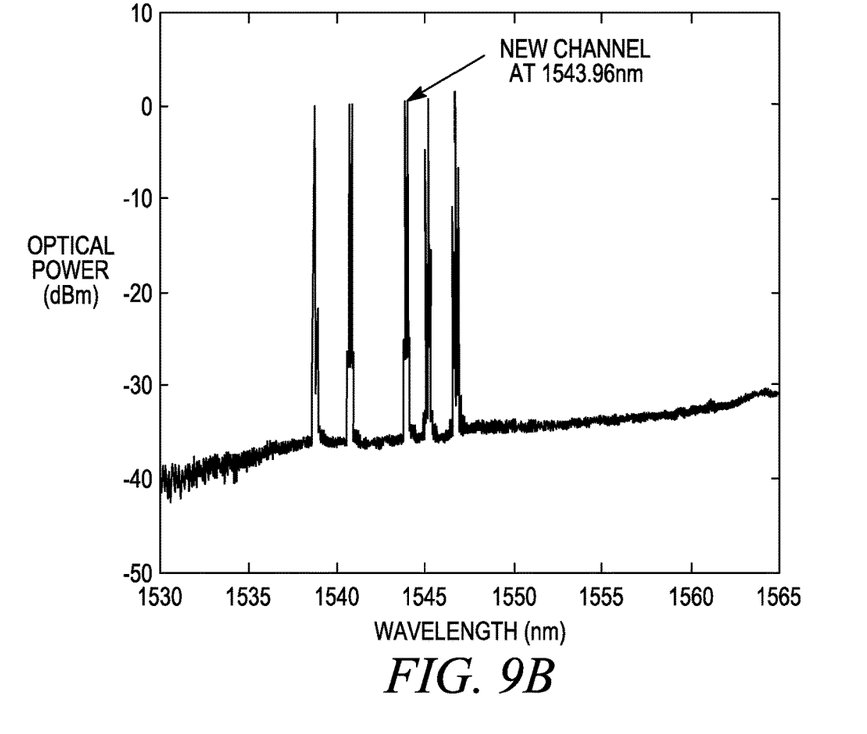
Figure 9C:
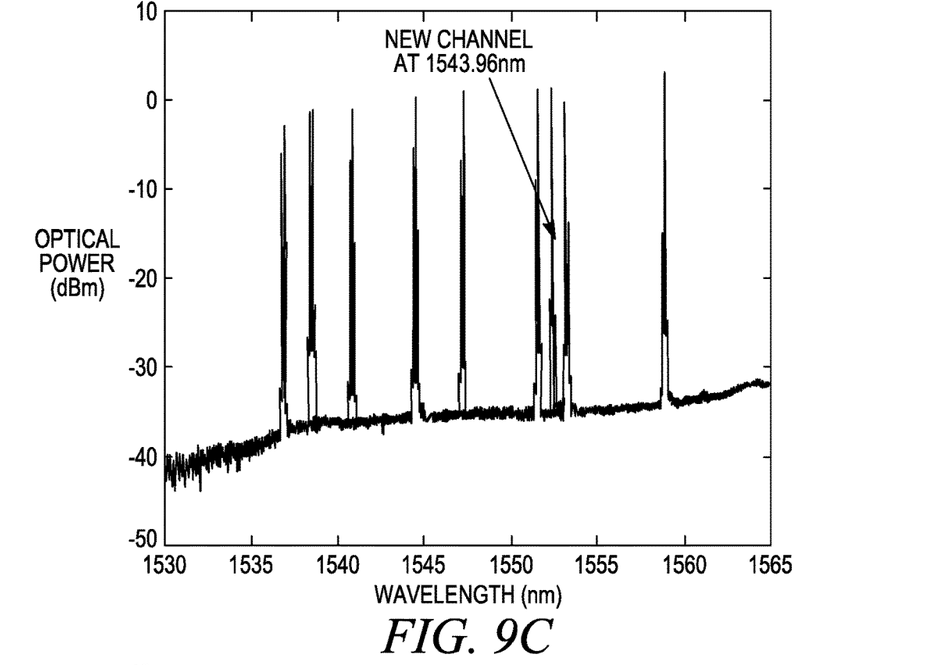
Figure 9D:
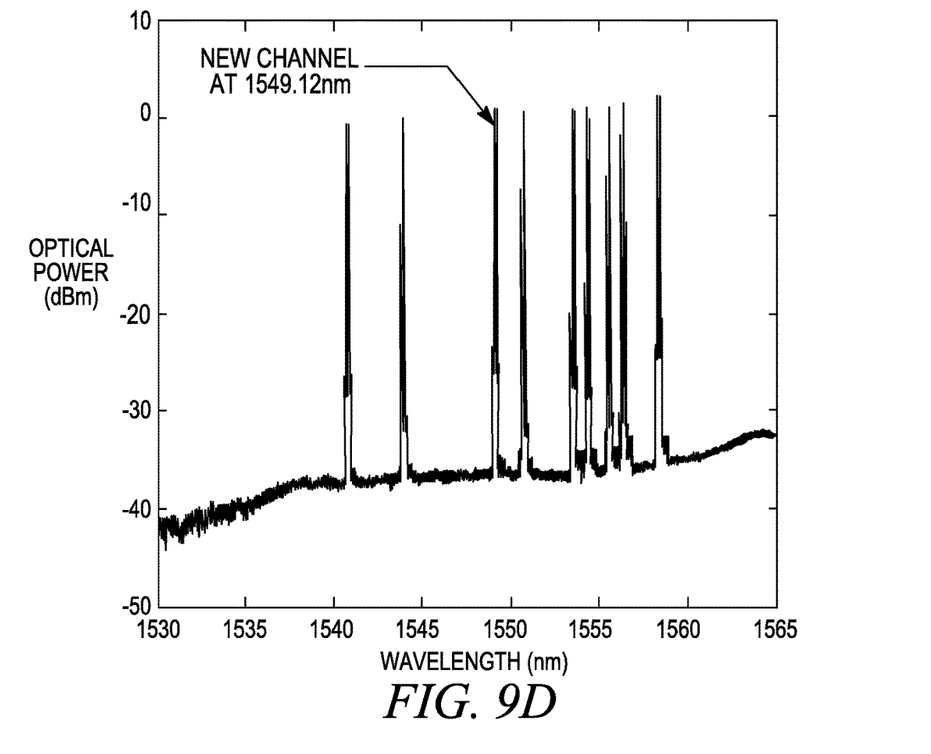

FIGS. 8(a) and 8(b) show the experimental results for a configuration of four existing channels at 1550.72 nm, 1552.34 nm, 1553.96 nm, and 1555.58 nm. The gain for these four lit channels were measured to be 12.6 dB, 12.8 dB, 13.0 dB, and 13.5 dB, respectively. FIG. 8(a) depicts the gain spectrum measured by the probe signal for the remaining 72 unoccupied wavelengths. The calculated power excursions for the probed wavelengths for this loading configuration are presented in FIG. 8(b). The calculated excursions fall within the variations observed across the different wavelengths. Note that although the magnitude of the excursions appears small, this is taken on top of any power divergence margins for the system and, furthermore, the excursion will continue to grow as the number of amplifiers traversed increases.

Based on the probing curves in FIG. 8(b), the wavelength at 1545.92 nm was selected for the new channel with a calculated minimal excursion of 0.002 dB. The actual maximum excursion (i.e. the maximum excursion among the four lit channels due to provisioning the new channel at the selected unoccupied wavelength) was then measured and found to be 0.1 dB. Note that the mathematical model does not include the ASE noise contribution and therefore estimates the same value of power excursion on all lit channels. In the experiment, different excursions (see FIG. 8(b)) are measured for different channels due to the ASE noise. However, despite this mathematical model's simplifying assumption, the mathematical estimation agrees well with the experimental results. In comparison to the probe-based wavelength assignment strategy described herein, a first-fit wavelength assignment algorithm leads to a significantly larger excursion of 0.8 dB.

The probing scheme described herein was demonstrated to work well for different loading configurations. As shown in FIGS. 9(a)-9(d) for the four different loading conditions, the SDN controller randomly launched four additional configurations of lit channels and in each case a new channel was established on an unoccupied wavelength with minimal power excursion penalty based on the results obtained from the probing process. The measured actual excursions are all less than or equal to 0.2 dB. Excursions were also measured due to the first-fit algorithm, which range from 0.5 dB to 1.1 dB for the different channel configurations. Note that in a multi-node, meshed-network scenario, the probing would be carried out between any two neighboring nodes to take the cascading effect into account.

In summary, measurement results have been obtained for a non-obtrusive and proactive channel probing method that estimates channel power excursions for fast wavelength reconfiguration and switching. Using this probing scheme, maximum power excursions less than or equal to 0.2 dB were achieved under different loading configurations within a single-hop metro-scale system. The performance estimates agreed well with experimental measurements.

The discussion above has largely assumed that the optical transmission network employs channels that are located at a fixed grid of wavelengths such as those specified by the International Telecommunication Union (ITU), in which the relevant optical spectrum range is divided into fixed-sized spectrum slots. In these networks, the provisioning of a new channel in a network that employs channels that are located on a fixed grid of wavelengths generally involves routing and wavelength assignment (RWA) algorithms. Recently, however, another approached has been proposed that employs a flexible grid or a so-called "flexgrid," which facilitates a new optical networking paradigm known as EON (elastic optical networking). The EON technologies allow for different network design and operation methodologies that can increase the amount of traffic the network can carry compared to conventional WDM networks. In the flexgrid approach, the optical spectrum can be divided up flexibly depending on requirements, and elastic optical paths (i.e. paths with variable bit rates) can be generated. Generally the spectrum grid in a flexgrid network is divided into much finer slot widths, e.g. 12.5 GHz or less, compared to the more typical 50 GHz in the fixed grid approach. Significantly, adjacent channels can be joined together to form arbitrary sized slots to carry signals of a variety of widths, allowing for signals ranging in size from an individual channel to those occupying the entire optical spectrum to be carried. In a network that employs a flexgrid, routing and spectral assignment (RSA) algorithms may be used to find lightpaths through the network.

Accordingly, the methods and techniques described herein are not limited in their application to channels that are assigned wavelengths located on a fixed grid. That is, these methods and techniques may be employed in flexgrid networks in which the channels may have different, dynamically adjustable bandwidths that are assigned wavelengths which are not located on a fixed predetermined grid. Moreover, in addition to being applicable to conventional optical channels, these methods and techniques may also be applicable to superchannels, which are channels that are formed by combining multiple optical subcarriers to create a composite optical signal of a desired capacity. In a superchannel, subcarriers are tightly packed and consume less optical spectrum than a conventional DWDM signal. That is, a typical superchannel includes a set of subcarriers that are frequency multiplexed to form a single channel. The superchannel may then be transmitted through an optical network as a single channel across network endpoints. For systems in which the superchannel sub-carriers may be turned on and off, the methods and techniques described herein may be used to determine the performance of the respective sub-carriers and be used to add or remove sub-carriers in an optimal manner.

In the embodiments described above, the optical probe pulse has a duration that is less than the response time of the optical amplifiers that the optical probe pulse traverses along its designated path. In other embodiments, however, the optical probe pulse may have a duration that is greater than the response time of the optical amplifiers, provided that the power of the optical probe pulse is reduced in proportion to the duration increase. In this way the optical amplifiers will experience a mean power that is no greater than the mean power the optical amplifiers would experience if the short duration optical probe pulse was used. In this context the mean power refers to the power of the optical probe pulse integrated over the response time of the optical amplifier. That is, the mean power is defined with respect to the amplifier response time. If the optical pulse probe is repetitive and the pulse rate is faster than the optical amplifier's response time, then the mean power is determined by the duty factor of the optical pulses.

For instance, if a 1 microsecond optical probe pulse arrives at an optical amplifier every 10 microseconds, where the amplifier has a 100 microsecond amplifier response time, the optical probe pulses would appear to the amplifier as a constant signal that is 10 dB lower in mean power than the actual pulse height. If on the other hand the 1 microsecond optical probe pulses arrive every 200 microseconds, then the optical pulses would appear to be fluctuating in power between zero and 20 dB (1%) below the actual pulse amplitude. If the duration of the optical probe pulse is increased to, say a 5 microsecond pulse arriving every 10 microseconds at the amplifier, then the mean power experienced by the amplifier would only be reduced by 3 dB and thus the power of the optical pulse would only need to be reduced by 7 dB (i.e. a 5 times reduction) to once again make the mean power experienced by the amplifier 10 dB lower. For a 200 microsecond pulse rate, a 5 microsecond pulse would be reduced in mean power by 13 dB and would again need to be lowered in peak power by 7 dB in order for the amplifier to experience a mean power reduced by 20 dB.

Although the subject matter has been described in language specific to structural features and/or methodological acts, it is to be understood that the subject matter defined in the appended claims is not necessarily limited to the specific features or acts described above. Rather, the specific features and acts described.

The invention claimed is:

1. A method for estimating channel power excursions of existing channels located at optical wavelengths currently occupied along an optical path through a WDM optical transmission system when a new channel is added to the path at an unoccupied optical wavelength, comprising:
   a. generating an optical probe pulse at the unoccupied wavelength, the optical probe pulse having a duration that is less than the response time of each of one or more optical amplifiers located along the path through which the optical probe pulse is to pass;
   b. transmitting the optical probe pulse through the path;
   c. determining gain imparted to the existing and probe channels after they traverse the optical path; and
   d. based at least in part on the measured gain imparted to the existing and probe channels, determining a gain excursion along the path arising from adding the probe channel to the path.

2. The method of claim 1, further comprising comparing the gain excursion to a threshold value and adding a new channel at the unoccupied wavelength if the gain excursion is below the threshold value.

3. The method of claim 1, further comprising repeating steps (a)-(d) for a plurality of unoccupied wavelengths and further comprising adding a new channel at one of the unoccupied wavelengths for which the gain excursion along the path is below a threshold value.

4. The method of claim 1, wherein at least one of the optical amplifiers is a rare-earth doped optical amplifier.

5. The method of claim 4, wherein the rare-earth doped optical amplifier is an erbium-doped optical amplifier.

6. The method of claim 1, wherein determining the gain excursion includes determining the gain excursion in accordance with a relationship in which a channel output power of a given channel after traversing the optical path depends upon an input channel power of the given channel, wherein the dependency is based at least in part on (i) a wavelength-dependent gain ripple of the optical amplifiers located along the path for the given channel and for the existing channels and (ii) an input optical power of the existing channels.

7. The method of claim 6, wherein the relationship is based on a model that includes a noise contribution from amplified spontaneous emission (ASE).

8. The method of claim 1, further comprising determining an optical signal to noise ratio (OSNR) of the optical probe pulse after it traverses the optical path.

9. The method of claim 8, wherein determining the optical signal to noise ratio (OSNR) of the optical probe pulse after it traverses the optical path includes measuring a power difference between a peak and non-peak of the optical probe pulse.

10. The method of claim 1, wherein determining the gain imparted to the existing and probe channels after they traverse the optical path includes measuring a gain ripple of the existing and probe channels after they traverse the optical path.

11. The method of claim 1, wherein the optical path extends between a pair of network nodes in the WDM optical transmission system.

12. The method of claim 1, further comprising determining chromatic dispersion of the optical probe pulse by measuring broadening or distortion of the optical probe pulse or modulation placed on the probe pulse after it traverses the optical path.

13. The method of claim 1, Wherein the WDM optical transmission system is a Reconfigurable Optical Add-Drop Multiplexing (ROADM) network.

14. The method of claim 1 wherein the one or more optical amplifiers are constant gain optical amplifiers.

15. The method of claim 1, further comprising repeating steps (a)-(d) for a plurality of unoccupied wavelengths and further comprising adding a plurality of channel at a respective plurality of the unoccupied wavelengths for which the gain excursions along the path is below a threshold value.

16. A method for estimating channel power excursions of existing channels located at optical wavelengths currently occupied along an optical path through a WDM optical transmission system when a new channel is added to the path at an unoccupied optical wavelength, comprising:
   a. generating an optical probe pulse at the unoccupied wavelength, the optical probe pulse having a mean power that is no greater than a mean power of a pulse that has a duration that is less than the response time of each of one or more optical amplifiers located along the path through which the optical probe pulse is to pass;
   b. transmitting the optical probe pulse through the path;
   c. determining gain imparted to the existing and probe channels after they traverse the optical path; and
   d. based at least in part on the measured gain imparted to the existing and probe channels, determining a gain excursion along the path arising from adding the probe channel to the path.

* * * * *